United States Patent
Harman, Jr. et al.

[19]

[11] Patent Number: 6,079,716
[45] Date of Patent: *Jun. 27, 2000

[54] REMOVABLE CHUCK

[75] Inventors: William G. Harman, Jr., Glen Rock, Pa.; Dale K. Wheeler, Fallston, Md.

[73] Assignee: Black & Decker Inc., Newark, Del.

[ * ] Notice: This patent is subject to a terminal disclaimer.

[21] Appl. No.: 09/167,305

[22] Filed: Oct. 6, 1998

Related U.S. Application Data

[63] Continuation-in-part of application No. 08/989,715, Dec. 12, 1997.

[51] Int. Cl.⁷ ...................................................... B23B 5/22
[52] U.S. Cl. ................... 279/75; 7/158; 7/165; 279/143; 279/145; 408/239 R
[58] Field of Search ................... 7/165, 158; 408/239 R; 279/143, 144, 145, 75

[56] References Cited

U.S. PATENT DOCUMENTS

| | | |
|---|---|---|
| 868,812 | 10/1907 | Ruegg . |
| 870,034 | 11/1907 | Hopkins . |
| 949,439 | 2/1910 | Rhyne . |
| 970,670 | 9/1910 | Wahlstrom . |
| 1,309,815 | 7/1919 | Schinkez . |
| 1,312,298 | 8/1919 | Bileck . |
| 1,484,379 | 2/1924 | Rainey . |
| 1,826,038 | 10/1931 | Altenbach . |
| 1,896,645 | 2/1933 | Pfauser . |
| 2,618,940 | 11/1952 | Wyzenbeek . |
| 2,620,210 | 12/1952 | Wüster . |
| 2,639,158 | 5/1953 | Procos . |
| 2,682,414 | 6/1954 | Richardson . |
| 3,116,068 | 12/1963 | Pfister et al. . |
| 3,929,343 | 12/1975 | Wanner et al. . |
| 3,932,904 | 1/1976 | Nilsson et al. . |
| 4,131,165 | 12/1978 | Wanner et al. . |
| 4,174,113 | 11/1979 | Eckman . |
| 4,184,692 | 1/1980 | Benson et al. . |
| 4,188,041 | 2/1980 | Soderberg . |
| 4,209,182 | 6/1980 | Sheldon . |
| 4,224,969 | 9/1980 | Plessner . |
| 4,234,277 | 11/1980 | Benson et al. . |
| 4,309,042 | 1/1982 | Fauth et al. . |
| 4,390,311 | 6/1983 | Kuhlmann . |
| 4,395,051 | 7/1983 | Tonomura . |
| 4,434,859 | 3/1984 | Rumpp et al. . |
| 4,456,412 | 6/1984 | Ford et al. . |
| 4,491,443 | 1/1985 | DeCaro . |
| 4,491,444 | 1/1985 | Rumpp et al. . |
| 4,491,445 | 1/1985 | Hunger et al. . |
| 4,502,824 | 3/1985 | Dohse et al. . |
| 4,514,117 | 4/1985 | Scott . |
| 4,536,113 | 8/1985 | Hatfield . |

(List continued on next page.)

FOREIGN PATENT DOCUMENTS

| | | |
|---|---|---|
| 465229 | 5/1950 | Canada . |
| 0 175 088 B1 | 3/1986 | European Pat. Off. . |
| 0 265 380 A2 | 4/1988 | European Pat. Off. . |
| 2249234 | 4/1974 | Germany . |
| 7540286 U | 9/1976 | Germany . |
| 3336549 A1 | 4/1984 | Germany . |
| 3412913 A1 | 10/1984 | Germany . |
| 3338060 C2 | 11/1985 | Germany . |
| 3507684 A1 | 9/1986 | Germany . |
| 9215412 U | 2/1993 | Germany . |
| 4203158 A1 | 8/1993 | Germany . |
| 9203627 U | 9/1993 | Germany . |
| 56-152545 | 11/1981 | Japan . |
| 86413 | 12/1919 | Switzerland . |
| WO 92/21469 | 12/1992 | WIPO . |

*Primary Examiner*—Andrea L. Pitts
*Assistant Examiner*—Monica Smith Carter
*Attorney, Agent, or Firm*—Harness, Dickey & Pierce, P.L.C.

[57] ABSTRACT

A removable chuck has a chuck member for holding a drill bit. Also, a mechanism is coupled with the chuck body to retain the chuck body to a drill spindle. The retention mechanism, in a first position, retains the chuck on the drill spindle and in a second position the chuck is enabled to be removed from the spindle.

10 Claims, 9 Drawing Sheets

U.S. PATENT DOCUMENTS

| | | |
|---|---|---|
| 4,550,476 | 11/1985 | DeCaro . |
| 4,588,335 | 5/1986 | Pearson, Jr. . |
| 4,592,560 | 6/1986 | Neumaier et al. . |
| 4,621,820 | 11/1986 | Röhm . |
| 4,629,375 | 12/1986 | Lleser . |
| 4,645,368 | 2/1987 | Simpson et al. . |
| 4,651,600 | 3/1987 | Zettl . |
| 4,691,929 | 9/1987 | Neumaier et al. . |
| 4,692,073 | 9/1987 | Martindell . |
| 4,701,083 | 10/1987 | Deutschenbaur et al. . |
| 4,767,246 | 8/1988 | Camloh et al. . |
| 4,775,269 | 10/1988 | Brix . |
| 4,818,157 | 4/1989 | Kouvelis . |
| 4,824,298 | 4/1989 | Lippacher et al. . |
| 4,863,323 | 9/1989 | Glaser . |
| 4,878,679 | 11/1989 | Plank et al. . |
| 4,900,202 | 2/1990 | Wienhold . |
| 4,906,147 | 3/1990 | Friesinger et al. . |
| 4,958,840 | 9/1990 | Palm . |
| 4,968,191 | 11/1990 | Palm . |
| 5,000,631 | 3/1991 | Deutschenbaur et al. . |
| 5,009,440 | 4/1991 | Manschltz . |
| 5,110,145 | 5/1992 | Stewart . |
| 5,167,478 | 12/1992 | Ramunas . |
| 5,171,030 | 12/1992 | Röhm . |
| 5,174,694 | 12/1992 | Voellmer . |
| 5,174,696 | 12/1992 | Bogner . |
| 5,180,261 | 1/1993 | Schreiber ................................ 279/145 |
| 5,199,833 | 4/1993 | Fehrle et al. . |
| 5,211,693 | 5/1993 | Pacher . |
| 5,255,993 | 10/1993 | Kovacs . |
| 5,265,988 | 11/1993 | Schmigalla et al. . |
| 5,330,206 | 7/1994 | Krumszyn et al. . |
| 5,342,154 | 8/1994 | Holzer ..................................... 279/143 |
| 5,381,707 | 1/1995 | Gill . |
| 5,398,946 | 3/1995 | Quiring . |
| 5,417,527 | 5/1995 | Wienhold . |
| 5,437,465 | 8/1995 | Vögele et al. . |
| 5,437,524 | 8/1995 | Huang . |
| 5,466,101 | 11/1995 | Meyen . |
| 5,470,084 | 11/1995 | Reibetanz et al. . |
| 5,573,358 | 11/1996 | Gobbers et al. . |
| 5,580,197 | 12/1996 | Röhm . |
| 5,586,847 | 12/1996 | Mattern, Jr. et al. . |
| 5,590,985 | 1/1997 | Mack . |
| 5,603,516 | 2/1997 | Neumaier . |
| 5,651,647 | 7/1997 | Ray . |
| 5,678,961 | 10/1997 | Fleege et al. . |

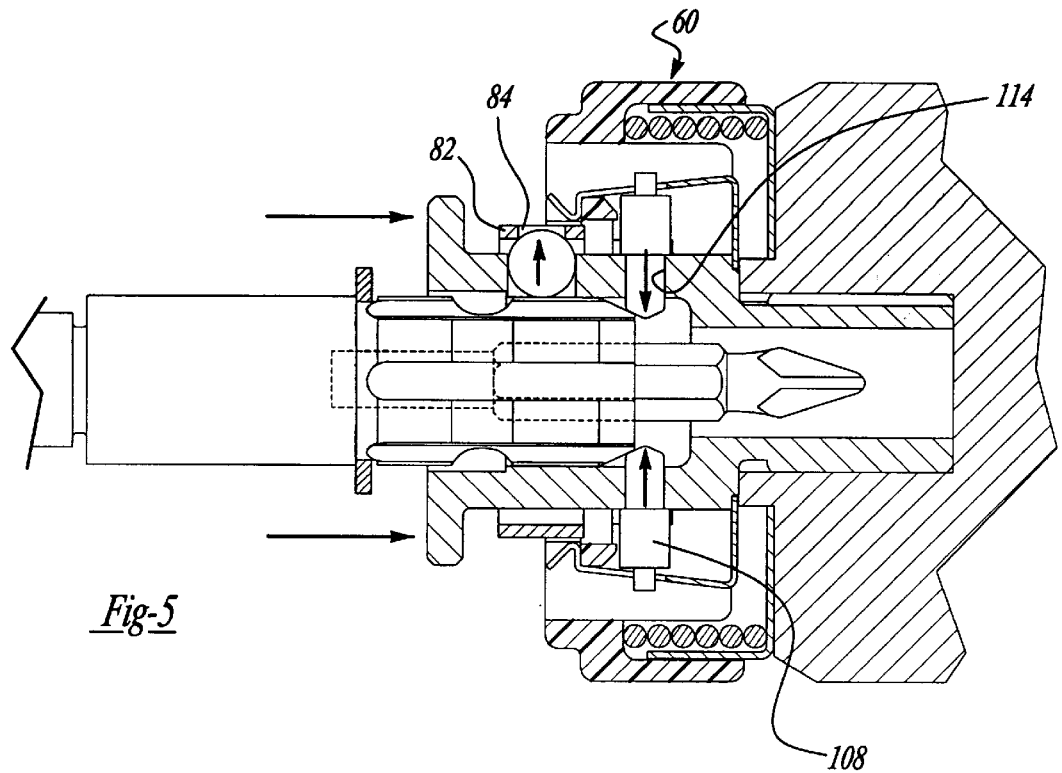
Fig-5
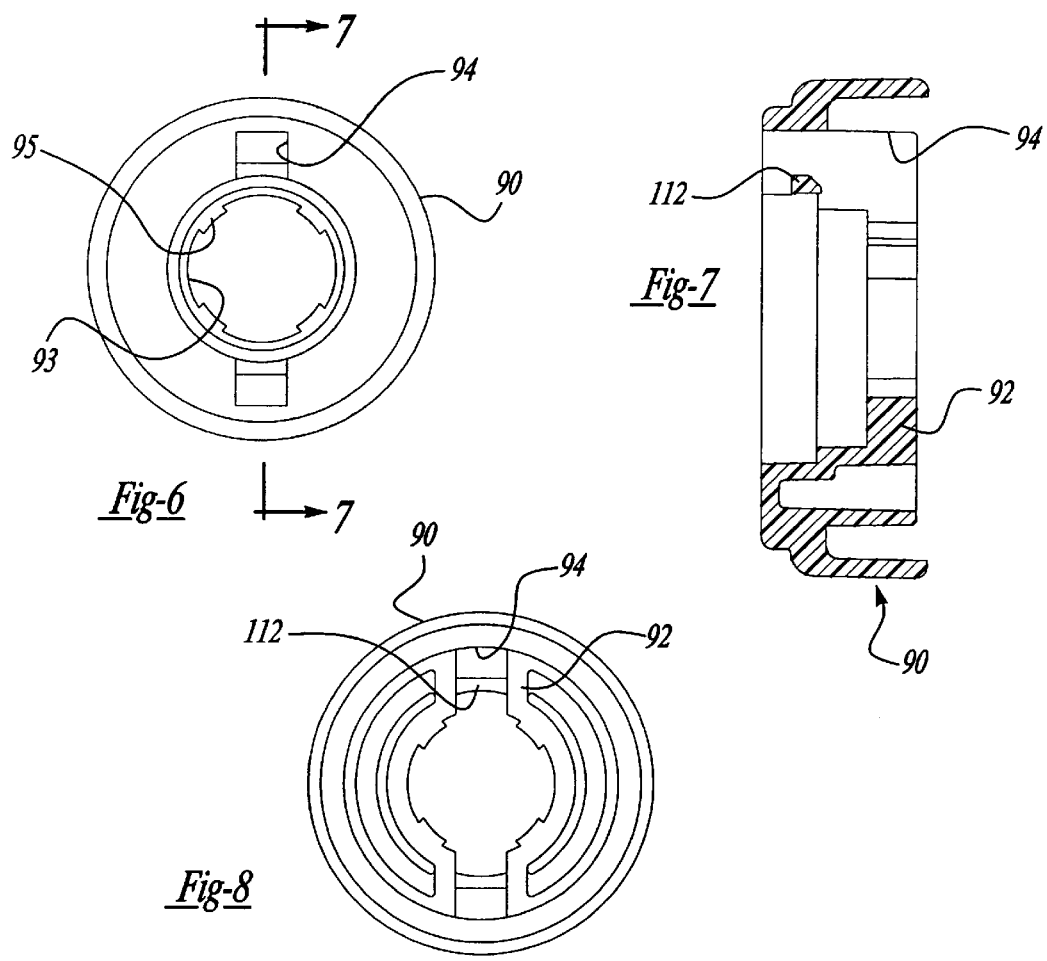
Fig-6
Fig-7
Fig-8

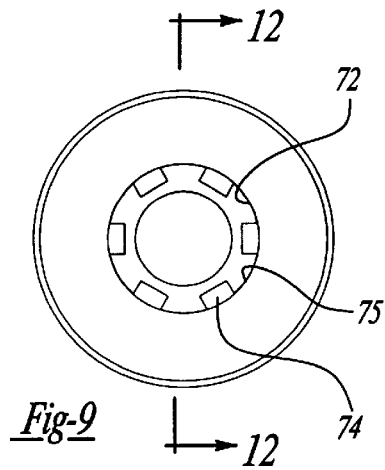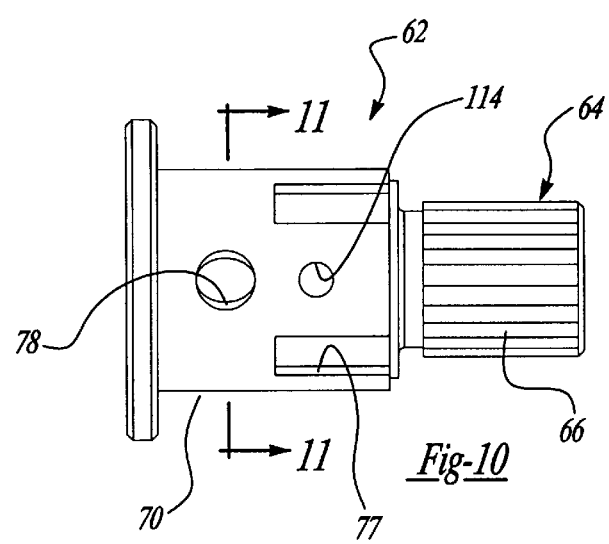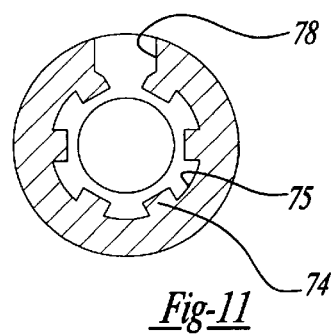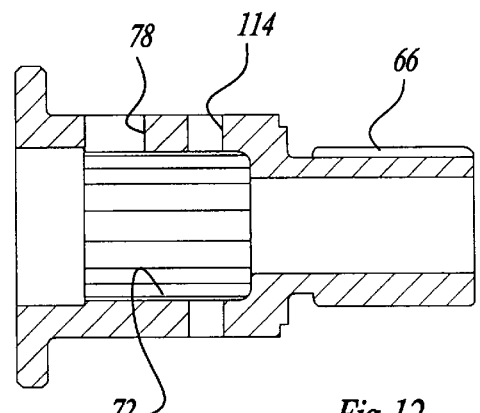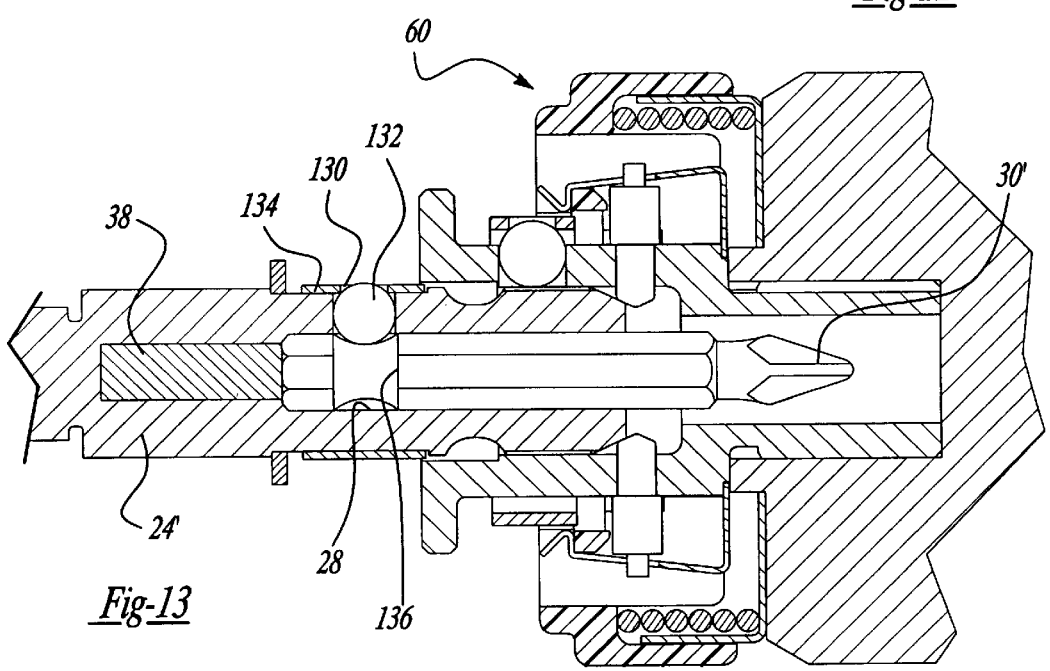

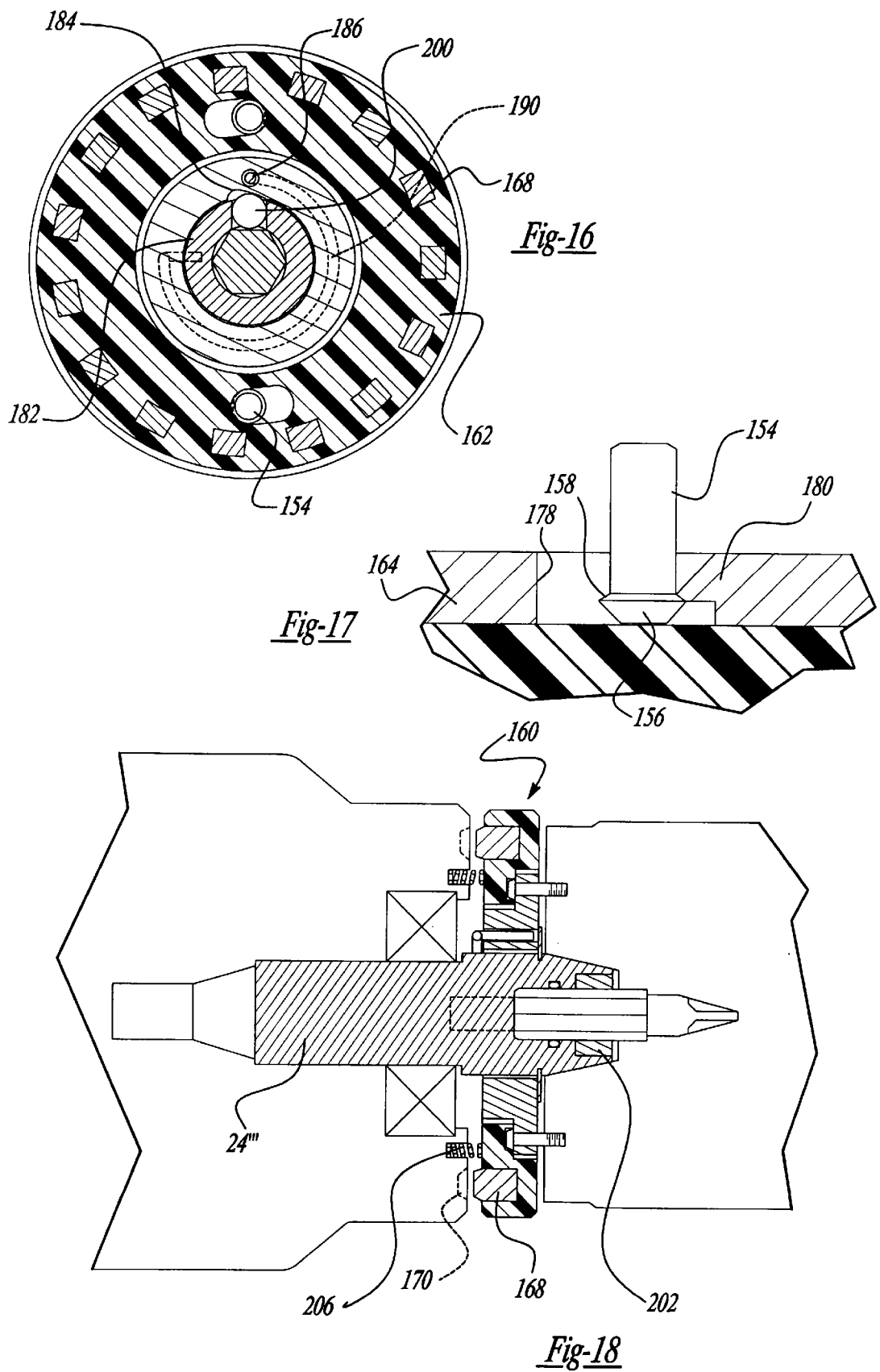

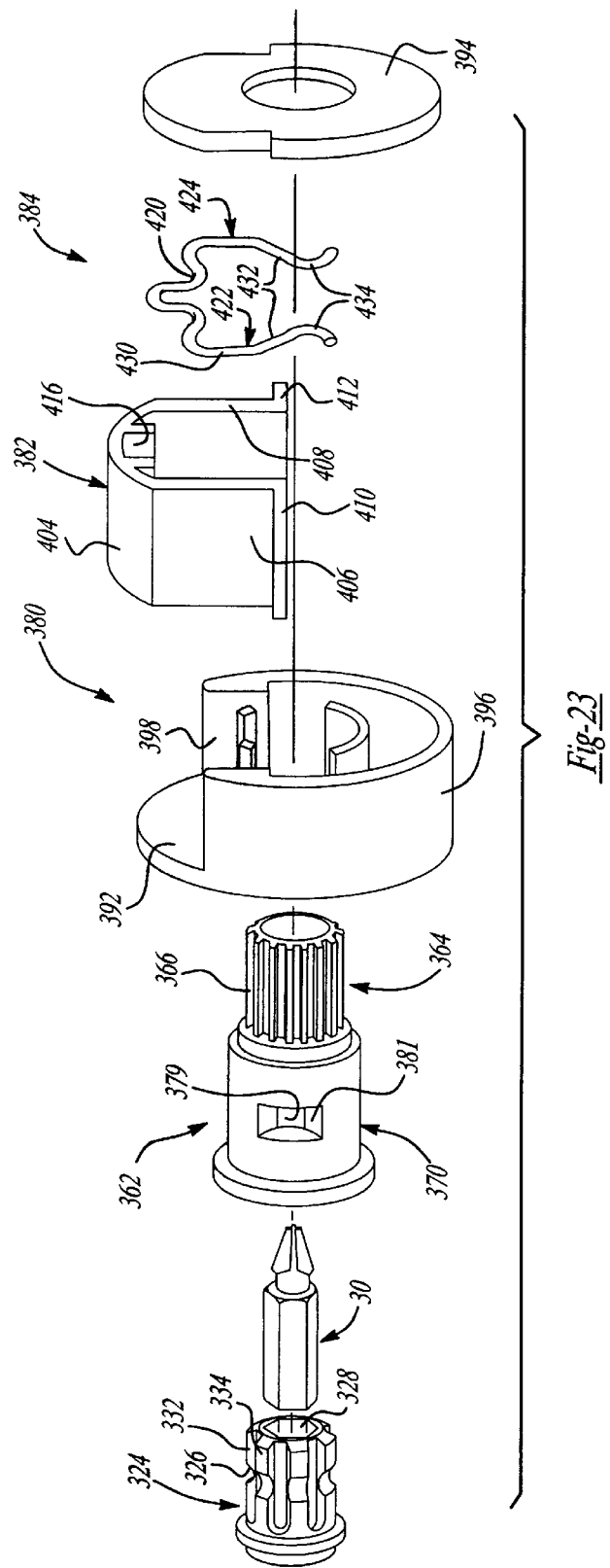

6,079,716

REMOVABLE CHUCK

CROSS-REFERENCE TO RELATED APPLICATION

This application is a continuation-in-part application of U.S. Application Ser. No. 08/989,715 filed Dec. 12, 1997 entitled REMOVABLE CHUCK, the specification and drawings are herein expressly incorporated by reference.

FIELD OF THE INVENTION

The invention relates to rotatable tools such as drills, hammer drill, screwdrivers, and other power tools. More particularly, the present invention relates to a removable chuck for a hand-held tool.

BACKGROUND OF THE INVENTION

In the consumer market, it is desirable to use rotatable tools with a drill bit to form holes in a workpiece. Also, it is desirous to insert fasteners, such as screws with a regular or Phillips, head into these holes to retain multiple workpieces together. Ordinarily, one uses the tool to drill the holes in the workpiece. After drilling the holes in the workpiece, the drill bit is removed from the chuck and a tool bit is inserted into the chuck for driving the fastener. While this has been an effective method for driving fasteners into the workpiece, it is burdensome and time consuming to continually drill holes remove the drill bit from the chuck and insert a tool bit to drive the fastener. Generally, this process is continued while connecting several workpieces together. Further, this process has been carried out in the professional power tool devices. Thus, it would be desirable to provide a chuck with the drill bit, which is removable from the tool to expose a spindle, with a tool bit, on the tool to drive the fasteners.

SUMMARY OF THE INVENTION

Accordingly, it is an object of the present invention to provide a removable chuck assembly embodying the foregoing design objectives.

In accordance with one aspect of the invention, a removable chuck comprises a sleeve adapted to connect with a rotating spindle. A chuck body is coupled with the sleeve. A locking mechanism is adapted to retain the sleeve on the rotating spindle. The locking mechanism has a locking member which seats in a recess in the spindle. A first biasing member holds the locking member in the recess to prohibit removal of the chuck. The biasing member is movable from a first position, where a force is applied on the locking member to hold the locking member in the spindle recess, to a second position where the locking member is out of the spindle recess applying a force on the first biasing member. A locking sleeve surrounds the biasing member. The locking sleeve, in a first position, prohibits expansion of the first biasing member which, in turn, prohibits removal of the locking member from the spindle recess. In a second position, the locking sleeve enables the first biasing member to expand which, in turn, enables removal of the sleeve from the spindle. Further, a mechanism maintains the locking sleeve in the second position to enable the sleeve to be readily replaced onto the spindle. The maintaining mechanism has a biasing member surrounding the sleeve. At least one pin is coupled with the biasing member and is in an aperture in the sleeve in contact with the spindle. A latch is coupled with the locking sleeve. In the locking sleeve first position, the pin is on the spindle. In the locking sleeve second position, when the chuck is being removed from the spindle, the pin moves further into the opening in turn latching the biasing member with the latch to maintain the locking sleeve in the second position. Upon replacing the sleeve onto the spindle, the pin returns into the sleeve opening, releasing the biasing member from the latch to enable the locking sleeve to return to its first position.

In accordance with a second aspect of the invention, a hand tool comprises a hand tool with a rotatable spindle. The spindle includes a recess. A removable chuck is coupled with the spindle. A sleeve couples the removable chuck with the rotatable spindle. A locking mechanism retains the sleeve on the rotating spindle. The locking mechanism has a locking member which seats in the spindle recess. A first biasing member holds the locking member in the recess. The biasing member is movable from a first position, where a force is applied on the locking member to hold the locking member in the spindle recess, to a second position, where the locking member is out of the spindle recess applying a force on the first biasing member. A locking sleeve surrounds the biasing member. The locking sleeve, in a first position, prohibits expansion of the first biasing member which, in turn, prohibits removal of the locking member from the spindle recess. In a second position, the locking sleeve enables the first biasing member to expand which, in turn, enables removal of the sleeve from the spindle. Further, a mechanism maintains the locking sleeve in the second position to enable the sleeve to be readily replaced onto the spindle. The maintaining mechanism has a biasing member surrounding the sleeve. At least one pin is coupled with the biasing member and is in an aperture in the sleeve in contact with the spindle. A latch is coupled with the locking sleeve. In the locking sleeve first position, the pin is on the spindle. In the locking sleeve second position, when the chuck is being removed from the spindle, the pin moves further into the opening in turn latching the biasing member with the latch to maintain the locking sleeve in the second position. Upon replacing the sleeve onto the spindle, the pin returns into the sleeve opening, releasing the biasing member from the latch to enable the locking sleeve to return to its first position.

In accordance with a third aspect of the invention, a removable chuck comprises a chuck member with a retention member projecting from the chuck member. A release member is adapted to couple with a spindle. The release member includes a member for locking the retention member with the release member. The retention member is a stud projecting from a rear surface of the chuck. The locking member has an opening to retain the stud. The locking member includes a flange which couples with the stud to retain the stud in the release member. The release member is rotatable between the first position and the second position to release the stud from the locking member.

In accordance with a fourth aspect of the invention, a hand tool comprises a hand tool having a rotatable spindle and a removable chuck. The removable chuck comprises a chuck member with a retention member projecting from the chuck member. A release member is adapted to couple with the spindle. The release member includes a member for locking the retention member with the release member. The retention member is a stud projecting from a rear surface of the chuck. The locking member has an opening to retain the stud. The locking member includes a flange which couples with the stud to retain the stud in the release member. The release member is rotatable between the first position and the second position to release the stud from the locking member and a retaining member secures the release member on the spindle. Also, the spindle has an aperture to receive a tool bit. Further, a second aperture is in the spindle to receive a locking member.

In accordance with a fifth aspect of the invention, a removable chuck comprises a sleeve adapted to connect with a rotatable spindle. A chuck body is coupled with the sleeve. A locking mechanism is adapted to retain the sleeve on the rotating spindle. The locking mechanism includes a locking member for seating in a recess in the spindle. The locking member is movable from a first position coupling the sleeve with the spindle, to a second position, where the locking member is decoupled from the spindle. The locking member biases between the first position where the sleeve is locked with the spindle to a second position which enables the sleeve to be removed from the spindle. The locking member is preferably an overall U-shaped spring for locking the sleeve with the spindle. Further, the locking member may include a housing and activation member and a biasing member. The activation member moves the biasing member between the first and second position to lock and enable removal of the sleeve from the spindle. The activation member moves transverse to the axis of the spindle.

In accordance with a sixth aspect of the invention, a hand tool comprises a hand tool with a rotatable spindle. The spindle includes a recess. A removable chuck is coupled with the spindle. A sleeve couples the removable chuck with the rotatable spindle. A locking mechanism retains the sleeve on the rotatable spindle. The locking mechanism includes a locking member to seat in the recess of the spindle. The locking member is movable from a first position coupling the sleeve with the spindle recess, to a second position, where the locking member is out of the spindle recess. The locking member biases between the first position where the sleeve is locked with the spindle, to the second position where the sleeve is enabled to be removed from the spindle. Further, the locking member includes a housing and activation member and a biasing member. The activation member moves the biasing member between the first and second positions to lock and enable removal of the sleeve from the spindle. The activation member moves transverse to an axis of the spindle.

Additional objects and advantages of the invention will become apparent from the detailed description of the preferred embodiment, and the appended claims and accompanying drawings, or may be learned by practice of the invention.

BRIEF DESCRIPTION OF THE DRAWINGS

The accompanying drawings, which are incorporated in and constitute a part of the specification, illustrate the present invention and together with the description serve to explain the principles of the invention. In the drawings, the same reference numerals indicate the same parts.

FIG. 5 is a cross-section view like that of FIG. 3 in a removable position.

FIG. 6 is a front plan view of the locking sleeve.

FIG. 7 is a cross-section view of FIG. 6 along line 7—7 thereof.

FIG. 8 is a rear plan view of the locking sleeve.

FIG. 9 is a front plan view of the spud.

FIG. 10 is a side plan view of the spud.

FIG. 11 is a cross-section view of FIG. 10 along line 11—11 thereof.

FIG. 12 is a cross-section view of FIG. 9 along line 12—12 thereof.

FIG. 13 is a cross-section view like FIG. 3 of an alternate embodiment of the spindle.

FIG. 16 is a plan view of the release mechanism.

FIG. 17 is a cross-section view of FIG. 16 along line 17—17 thereof.

FIG. 18 is a cross-section view like that of FIG. 15 illustrating an alternate embodiment of the spindle.

FIG. 23 is an exploded perspective view of the locking member of FIG. 20.

DETAILED DESCRIPTION OF THE PREFERRED EMBODIMENT

Figure 1:
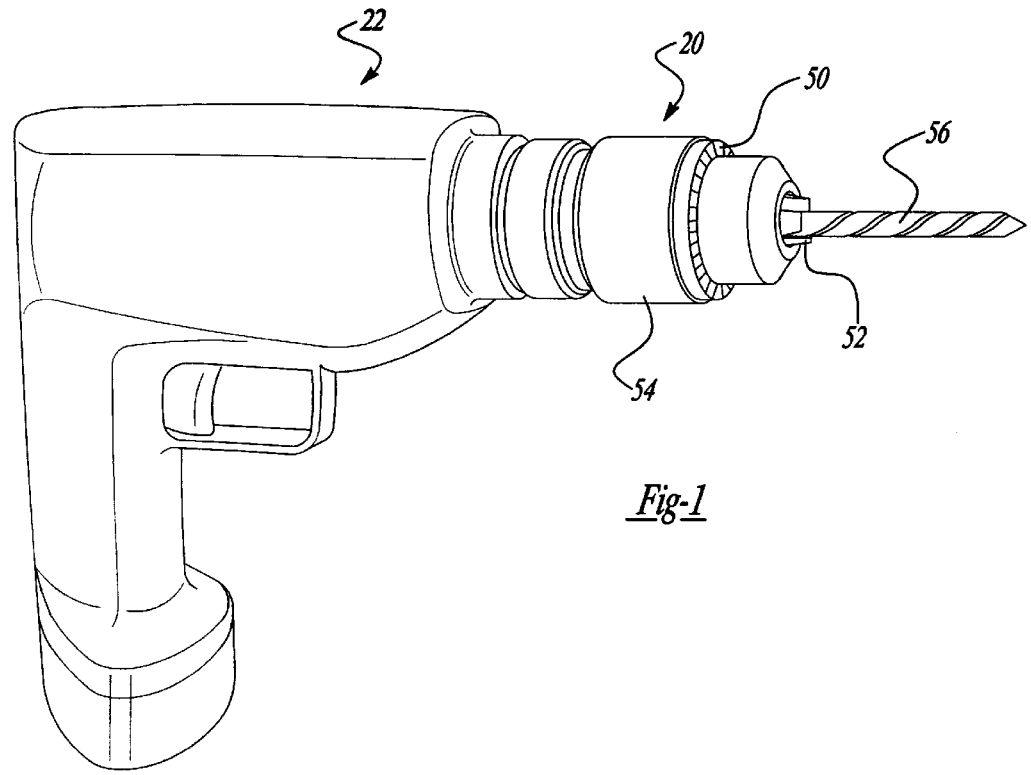
FIG. 1 is a perspective view of a tool with the removable chuck of the present invention.
Figure 2:
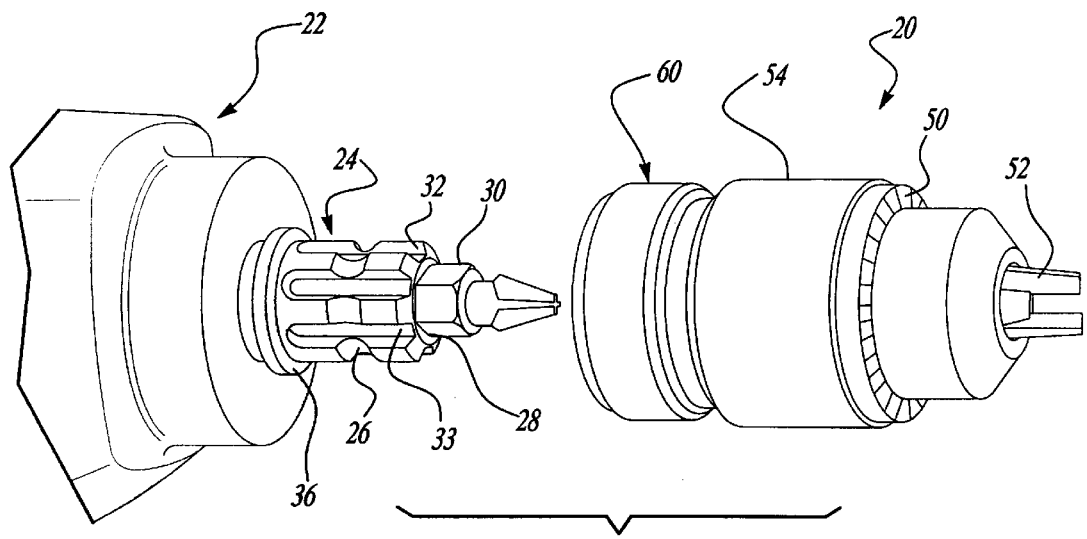
FIG. 2 is a perspective view of FIG. 1 with the chuck removed from the spindle.

Turning to the figures, particularly FIGS. 1–12, a removable chuck 20 is illustrated on a tool 22. In this particular embodiment, the tool 22 is a rotary drill, however a hammer drill or power screwdriver would work equally well. The drill 22 includes a spindle 24 which, in turn, includes an aperture 28 to receive a tool bit 30. The spindle 24 includes a circumferential groove 26 as well as a plurality of raised members 32 separated by axial channels 33. Also, a retaining ring 36 is received in a notch 40 in the spindle to prohibit additional forward movement of the chuck 20 onto the spindle 24. A magnet 38 is positioned in the spindle 24 to magnetize the tool bit 30 as well as to retain the tool bit in the bore. Likewise, the raised members 32 and channels 33 provide the drive connection with the chuck 20.

The chuck 20 includes a body 50, jaw members 52 with a locking sleeve 54, which are conventional, to retain a drill bit 56 within the chuck 20. A retaining mechanism 60 is at the rear of the chuck body 50 to enable the chuck 20 to be secured with and removed from the spindle 24.

The retention mechanism 60 includes a drive sleeve or spud 62. The spud 62 (best seen in FIGS. 9–12) has a first tubular portion 64 which may have splines or the like 66 which are press-fit into an aperture 68 in the rear of the chuck body 50 to secure the spud 62 with the chuck body 50. The second tubular portion 70 of the spud has bore 72 with corresponding raised members 74 and axial channels 75 to mate with the spindle 24. Channels 77 are formed on the exterior surface of the second tubular portion to enable axial non-rotatable movement of the sleeve 90 with respect to the spud 62.

Figure 3:
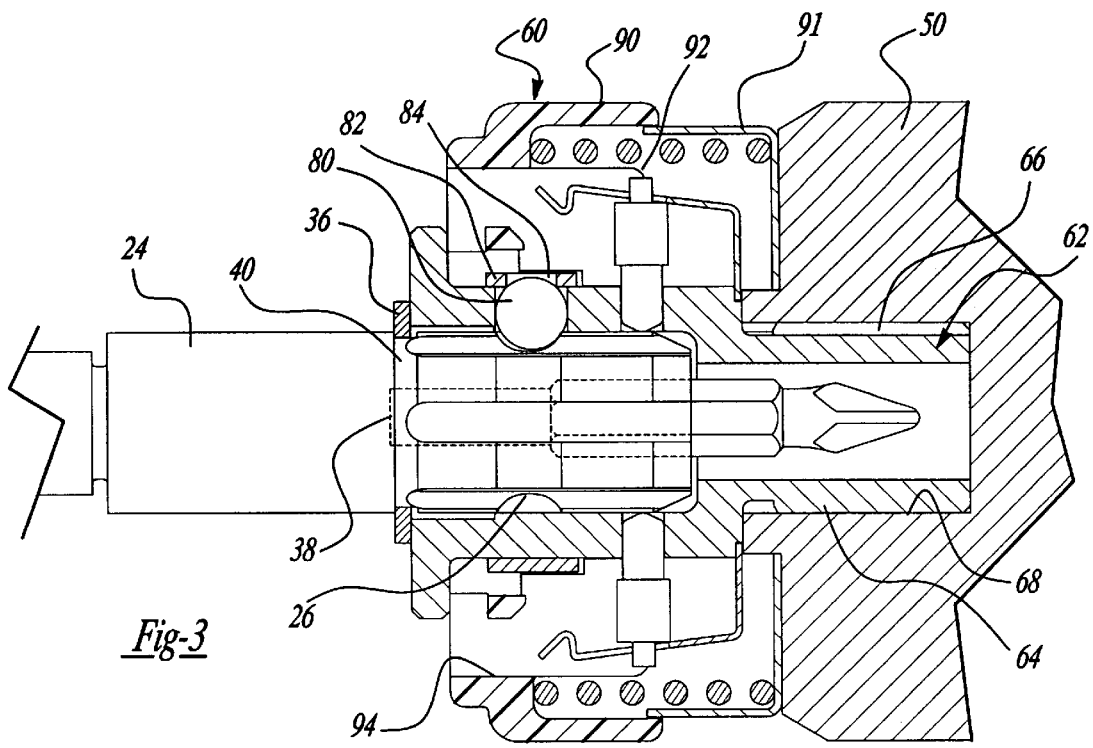
FIG. 3 is a cross-section view of FIG. 1 along line 3—3 thereof.
Figure 4:
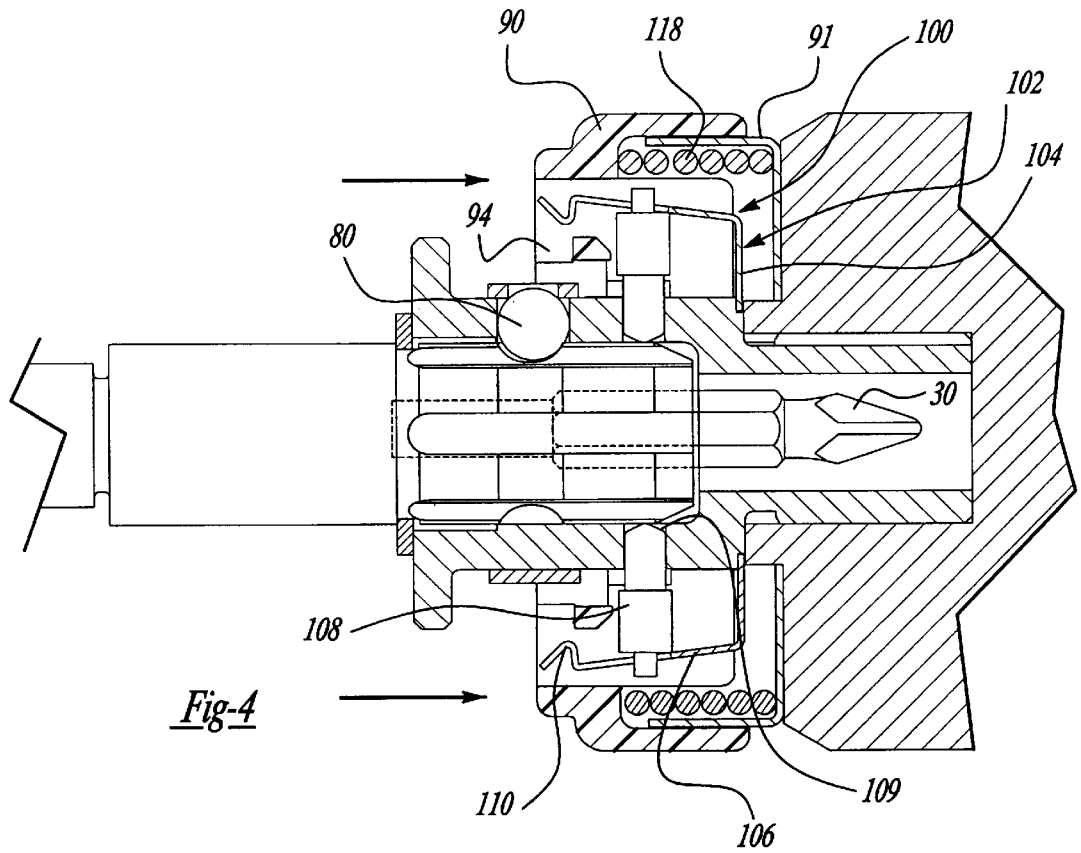
FIG. 4 is a view like that of FIG. 3 during an intermediate removal step of the chuck.
Figure 14:
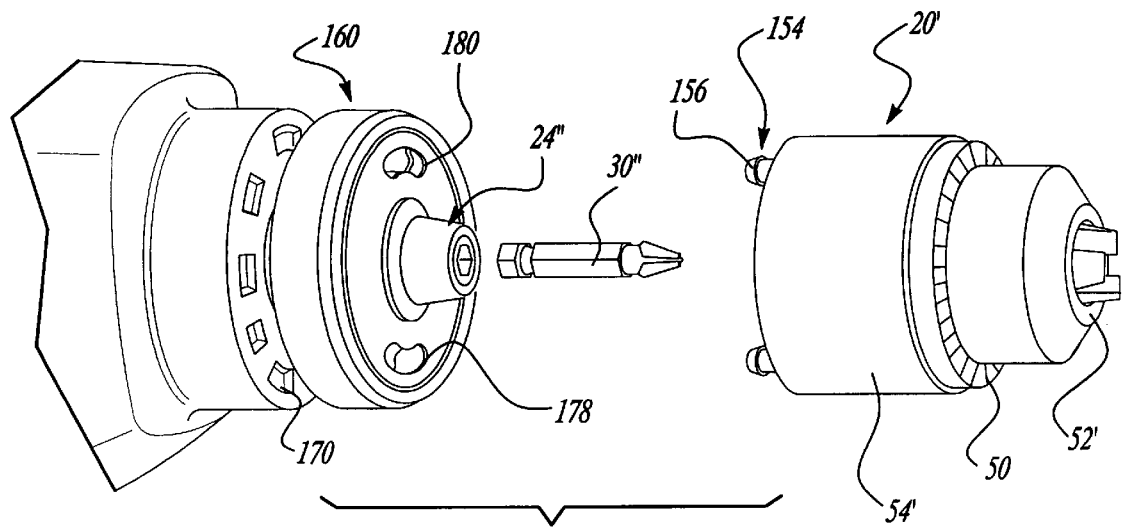
FIG. 14 is a perspective view of a second embodiment with the removable chuck removed from the spindle in accordance with the present invention.
Figure 15:
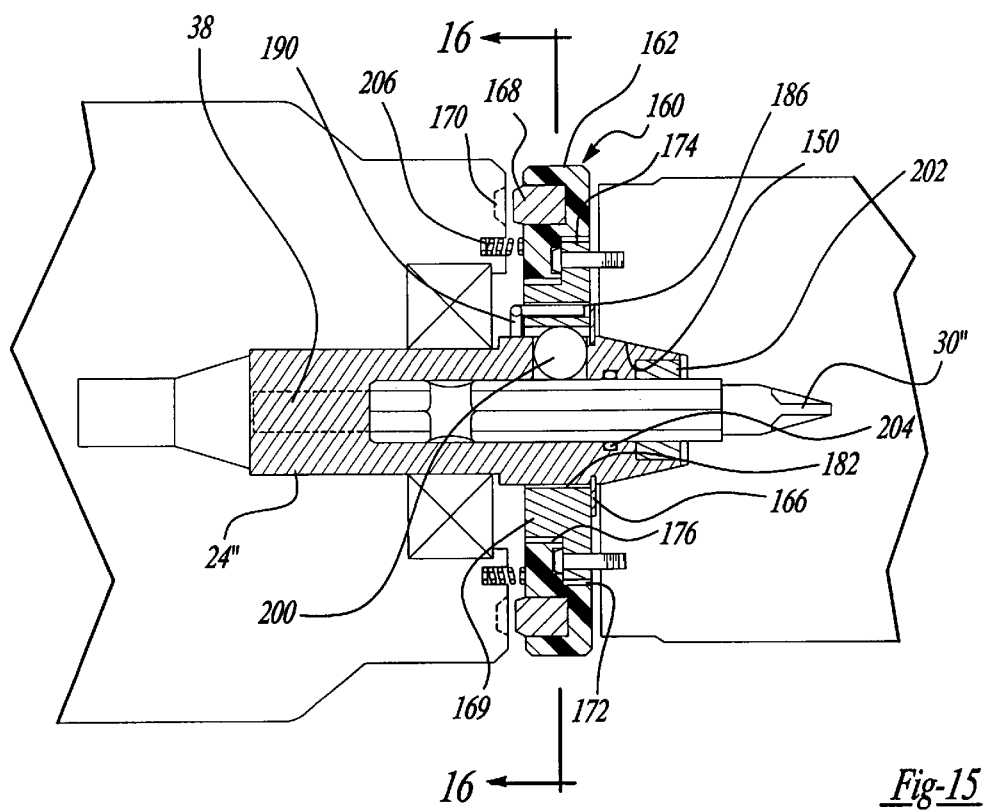
FIG. 15 is a cross-section view of FIG. 7 with the chuck connected with the tool.

The spud second portion 70 includes an aperture 78 which receives a detent locking ball 80. The locking ball 80 seats in the spindle groove 26. A first biasing spring ring 82 is positioned about the exterior of the drive spud second portion 70. The spring ring 82 is circular with a gap between the ends and has an aperture 84 which is positioned on top of the detent ball 80. The spring ring 82 is in a constricted position retaining the ball 80 within the groove 26 as illustrated in FIGS. 3 and 4. The spring ring 82 radially expands to a second position as illustrated in FIG. 5 when the retention mechanism 60 is in a release or second position which enables the chuck 20 to be pulled off the spindle 24. To accomplish this, the detent ball 80 is moved from the groove 26 to apply a force onto the spring ring 82. The force expands the spring ring 82 as the detent ball 80 rolls out of the recess 26 which, in turn, enables removal of the chuck.

The retention mechanism 60 also includes a first and second sleeve 90 and 91. The first sleeve 90 (best seen in FIGS. 6–8) includes an inner boss 92 which defines a central bore 93 that surrounds the spring ring 82 to prohibit expansion of the spring ring 82 when the first sleeve 90 is in a first or retaining position as illustrated in FIG. 3. The boss 92 has a pair of openings 94 which enables a latching mechanism 100 to project through the boss 92. The latching mechanism 100 maintains the first sleeve 90 in its second position once the chuck is removed from the spindle. With the first sleeve 90 maintained in its second position, it easily enables the chuck 20 to be positioned back onto the spindle 24 after removal. The central bore 93 is stepped and has projections 95 which are received in spud channels 77. This meshing of the projections 95 with the channels 77 prohibits rotational movement of the locking sleeve 90 and enables axial movement of the sleeve 90. This prohibits rotation which would dislodge the retention mechanism from its position and function.

The latch mechanism 100 includes a latching spring 102 which has a circular collar 104. The collar 104 is fixed between the spud 62 and rear of the chuck when the spud 62 is press-fit into the chuck body 50. Two fingers 106 extend into the pair of boss openings 94. Latch pins 108 are secured in an opening of the split fingers 106. The pins 108 enable the locking sleeve to be retained in a second position. The pins 108 have conical ends 109 which enable the pins to ride upon the tapered spindle end when the chuck is returned onto the spindle. The fingers 106 include angled feet 110 which contact a ring portion 112 within the boss apertures 94.

The pins 108 extend through bores 114 in the second tubular portion 70 of the spud 62. The pins 108 ride or slide on the spindle 24 in a locked position as illustrated in FIG. 3. As the chuck 20 is removed from the spindle 24, the pins 108 move inward into the bore 114 of the spud 62 which, in turn, enable the angled feet 110 to be latched with the inner ring 112. Thus, this maintains the locking sleeve 90 in its second or released position. If the fingers 106 become released from ring portions 112 when the chuck is removed from the spindle 24, the angled feet 110 enable the fingers to lift up, grasping the ring portions 112 and returning the first sleeve 90 to its second position.

A coil spring 118 is positioned between the first and second sleeves 90, 91 to return the first sleeve 90 to its first position after the chuck 20 is returned to the spindle 24. Also, the spring 118 maintains the second sleeve 91 on the spud. When the pins 108 contact the spindle 24, the pins 108 move outwardly which, in turn, releases the angled feet 110 from the portion 112 to enable the first sleeve 90 to return to its first position. Also, the coil spring 118 maintains the first sleeve 90 in its first position to maintain the detent ball 80 within the recess 26 and the boss 92 covering the spring ring 82.

To actuate the first sleeve 90, to remove the chuck 20 from the spindle 24, the first sleeve 90 is moved from the first position illustrated in FIG. 3 axially, to a telescoping position over second sleeve 91 as shown in FIG. 4. As the first sleeve 90 moves axially, the boss 92 uncovers the spring ring 82. As the drive spud 62 is moved away from the retaining ring 38, the detent ball 80 begins to roll out of the groove 26 and apply a force onto the spring ring 82 which expands the spring ring and in turn enables the detent ball 80 to be removed from the spindle groove 26. As this occurs, the chuck can then be removed from the spindle as illustrated in FIG. 5.

Turning to FIG. 13, an additional embodiment of the tool is shown. Here, the removable chuck is the same as disclosed above. However, the spindle is different. The spindle 24' includes a deeper central bore 28' and a transverse aperture 130. A detent ball 132 is positioned in the aperture 130 and is held in the aperture by a spring ring 134, like spring ring 82. Here, the spud 62 is positioned over the ball 132 when the chuck 20 is positioned onto the spindle 24'. After the chuck 20 has been removed from the spindle 24', the tool bit 30' with its circumferential recess 136 may be withdrawn from the spindle 24' by initiating a pull-out force on the tool bit 30' which, in turn, pushes the detent ball 132 against the spring ring 134 to expand the spring ring 134 to enable the tool bit 30' to be removed from the spindle 24'.

Turning to FIGS. 14–18, another embodiment of the present invention is shown. The elements which are the same are identified by the same reference numerals.

A removable chuck 20' is illustrated and includes a chuck body 50', jaws 52', and lock ring 54'. The rear of the chuck body 50' includes a tapered bore 150 to receive the spindle 24". The bore 150 may have a cross-section configuration corresponding to the spindle, as described above, to aid in rotating the chuck 20'. Also, the chuck body 50' includes at least one projecting stud 154 which includes a head 156. Here, two studs 154 are shown.

A release member 160 is maintained on the spindle 24'. The release member 160 includes a plastic outer disc 162 and a press metal inner disc 164 press fit into the outer disc 162. The disc members 162 and 164 are maintained on the spindle 24" by a retention ring 166. The release member 162 has projecting members 168 for coupling with recess 170 on the housing as will be explained herein.

The disc 162 includes an annular recess 172 to receive a portion 174 of the disc 164. Also, the disc 162 includes a central opening 176 to receive the disc 164.

The disc 164 includes at least one oblong cut-out 178 to receive the head 156 of the stud 154. Also, a flange 180 is at one end of the oblong shape cut-out 178. The head 156 of the stud 154 inserts behind the flange 180 to retain the stud and in turn the chuck 20' with the release mechanism 160 (See FIG. 17). The head 156 has an angled rear surface 158 which serves to draw the chuck bore 150 in better contact with the tapered spindle head.

The disc 164 includes a central opening 182 which includes a cut-out portion 184. The opening enables the spindle 24" to pass through the disc 164. Also, the disc 164 includes an aperture 186 to receive an end of a torsion spring 190 which is positioned about the spindle 24". The spring 190 biases the rotatable release mechanism 160 between a first and second position. In turn, the torsion spring 190 returns the release member back to its first position. The other end of the torsion spring is positioned into a bore in the spindle.

The cut-out 184 in the disc member 164 receives a detent ball 200 in the spindle 24". The ball 200 enables removal of the tool bit 30" from the spindle 24".

The spindle 24" includes a collar 202 press-fit into the end of the spindle 24". The collar 202 is generally a press metal part having a circular exterior and a hexagonal cross-sectional interior bore. The bore receives the tool bit 30". Also, a rubber or steel friction ring 204 having a C-shape is positioned in the bore of the spindle. The friction ring 204 serves to minimize nuisance movement of the screwdriver bit 30" forward with chuck removal. The detent ball 200 rides on a flat portion of the tool bit 30". If the tool bit 30" would be withdrawn forwardly from the spindle, the ball 200 would eventually catch the circumferential groove of the tool bit 30", prohibiting further forward movement of the tool bit.

The projecting members 168 which extend from the release member 160 mate with the recesses 170 in the housing for an active spindle lock. To activate the spindle lock, the release member is grasped and moved backward against springs 206 until the projecting members 168 insert in the recess 170. As this occurs, the spindle rotation ceases and an effective spindle lock is provided. When the release mechanism 160 is released, the springs 206 push it forward, releasing the spindle lock, enabling rotation of the spindle.

Turning to FIG. 18, an additional embodiment of the spindle 24'" is shown. Here, the differences relate to the spindle central bore and the detent ball has been removed. The disc 164' does not include the cut-out portion and thus rotates around the spindle. Also, the tool bit may be removed from the bore within the spindle.

Figure 19:
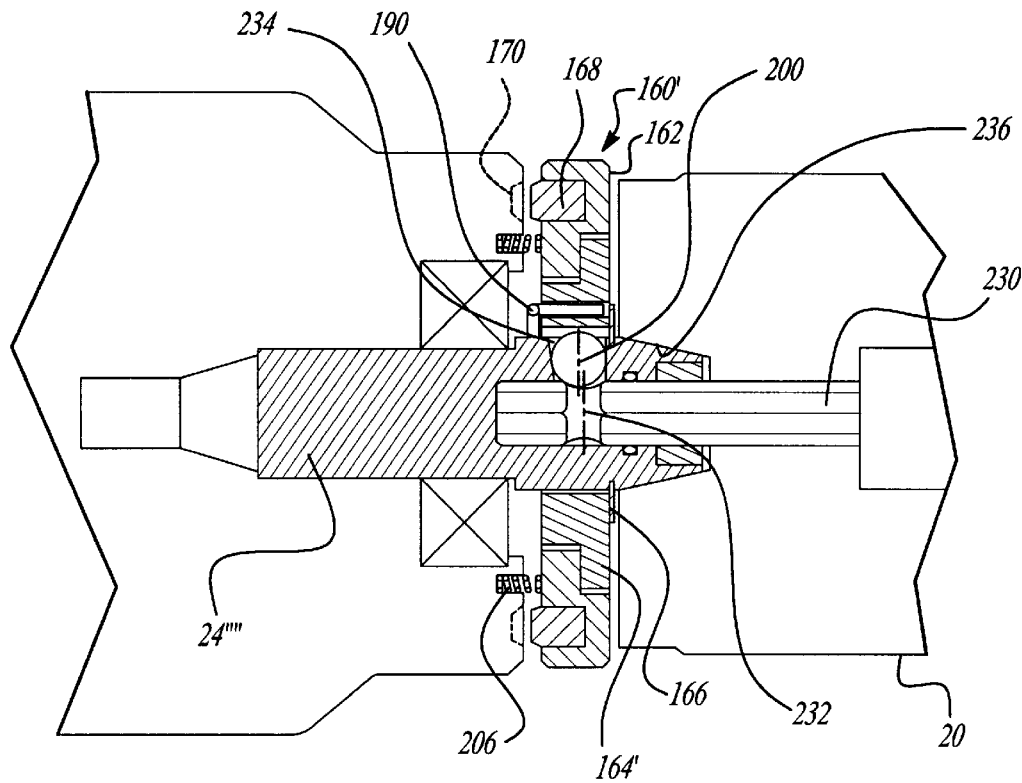
FIG. 19 is a cross-section view like that of FIG. 15 illustrating an alternative embodiment.
Figure 20:
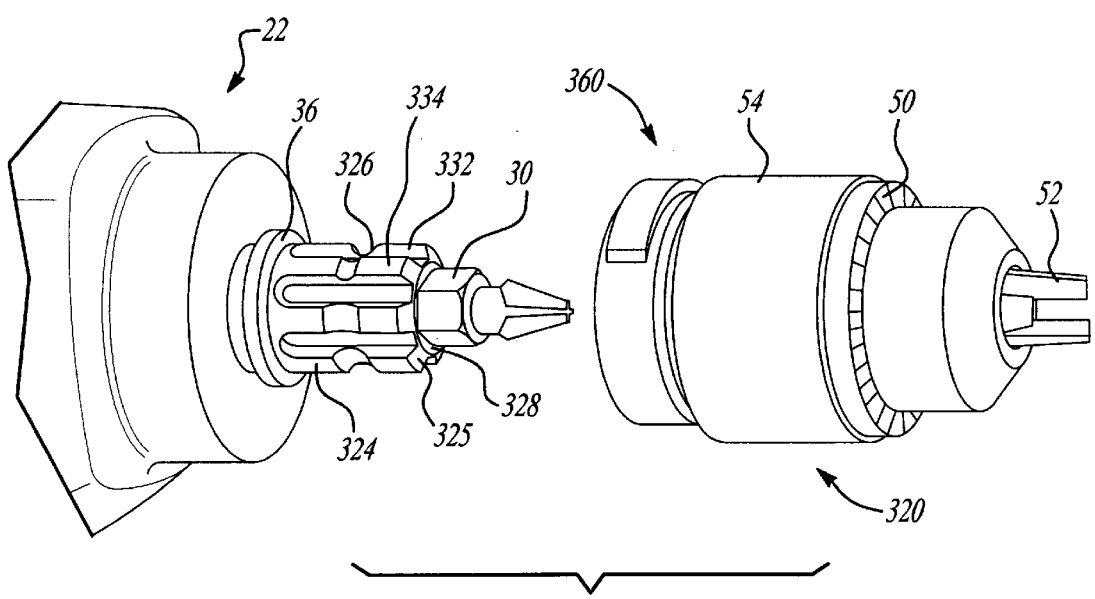
FIG. 20 is a view like FIG. 2 of an additional embodiment of the present invention.
Figure 21:
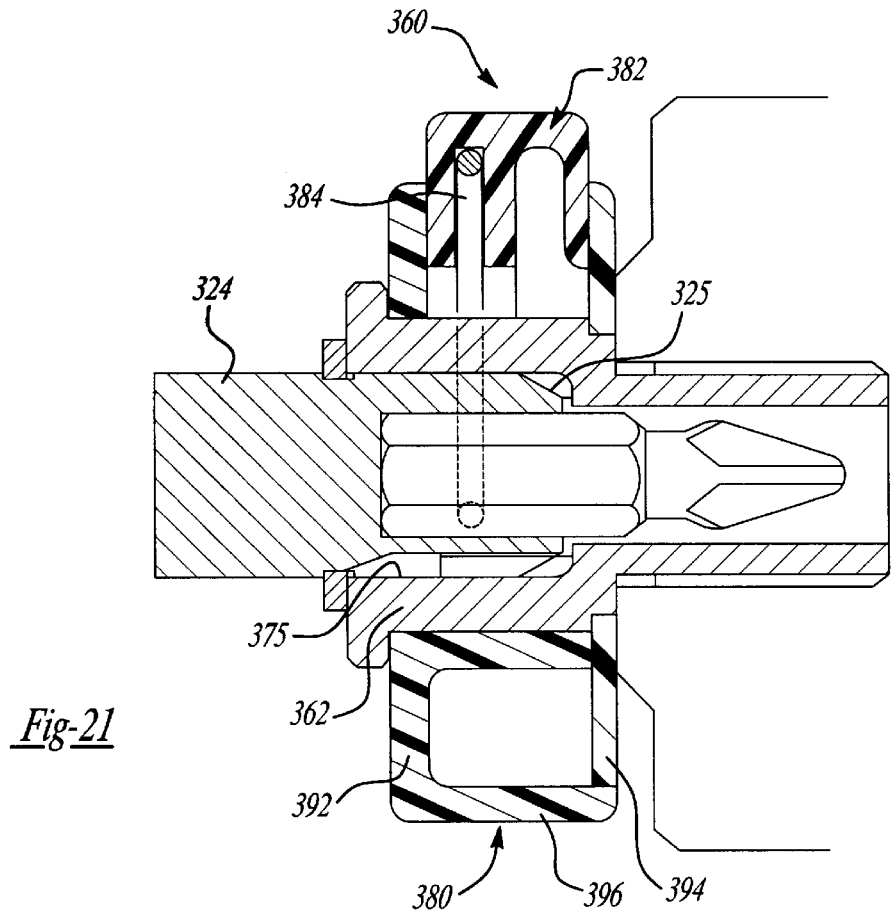
FIG. 21 is a cross-section view along line 21—21 of FIG. 20 in an assembled position.

FIG. 19 is an additional embodiment of the present invention. FIG. 19 is similar to FIG. 15; however, the posts, as well as the apertures in the release member, are not present. Here, a hexagonal shaft 230 is secured with the chuck 20" by being press fit or the like into a bore in the chuck 20. Also, a circumferential groove 232 in the shaft 230 is in contact with the ball 200 to retain the chuck 20" on the spindle 24"". The remainder of the release mechanism 160' is the same as that previously discussed. Upon rotation of the release mechanism 160', the ball 200 moves into cut-out 184, enabling the shaft to be removed from the spindle 24"". Also, the spindle bore 234, which the ball 200 is retained in, is angled with respect to vertical to prohibit the ball from passing through the spindle bore 234. The ball 200 exerts a rearward force on the shaft 230 to enhance the conical contact between the spindle head and the chuck conical bore 236 so that wobble does not occur in a no load condition.

The force is created by the undercut groove 232 on shaft 230 being positioned with respect to spindle 24"" such that the center of the groove 232 is to the right of the center of the bore 234. Thus, the ball 200 is in contact with the left side of the groove 232 exerting the rearward force.

FIGS. 20–23 illustrate another embodiment of the present invention. A removable chuck 320 is illustrated adjacent a tool 22. The tool is like that previously described. The tool 22 includes a spindle 324 which, in turn, includes an aperture 328 to receive a tool bit 30. The spindle 324 includes a recess 326 about the periphery of the spindle. Also, a plurality of raised members 332 separated by axial channels 334 are on the spindle 324. A retaining ring 36 is received in a notch 340 in the spindle to prohibit additional forward movement of the chuck 320 onto the spindle 324. A magnet (not shown) may be positioned in the spindle to magnetize the tool bit 30 as well as to retain the tool bit 30 as well as to retain the tool bit in the bore. Likewise, the raised members 332 and 334 provide the drive connection with the chuck 320.

The chuck 320 is substantially the same as that previously described and includes a body 50, jaw members 52 and a locking sleeve 54 which are conventional, to retain a drill bit within the chuck 320. The locking mechanism 360 is at the rear of the chuck body 50 to enable the chuck 320 to be secured with and removed from the spindle 324.

The retention mechanism 360 includes a drive sleeve or spud 362. The spud 362, as best seen in FIG. 23, is like that previously described in FIGS. 9–12 with identical parts identified with like numerals which have been increased by 300.

Figure 22:
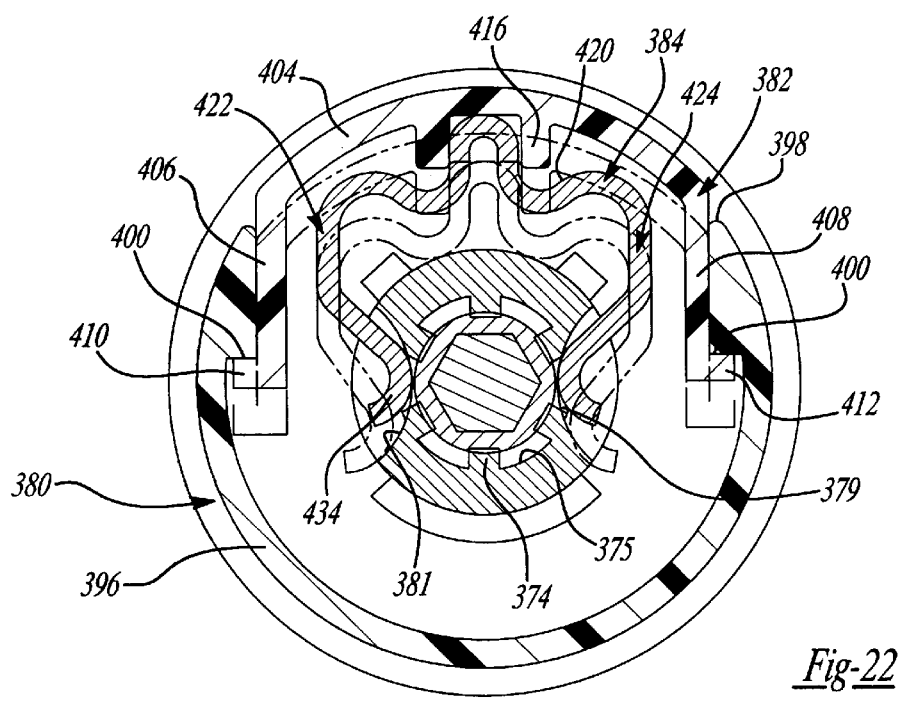
FIG. 22 is a cross-section view along line 22—22 of FIG. 20 in an assembled position.

The difference between the spud 362 and that of FIGS. 9–12 is that the spud includes recesses 379 which enable a locking member to pass therethrough to couple with the recesses on the spindle 324. The recesses are on opposing sides of the spud 362 as illustrated in FIG. 22.

Further, the retention mechanism 360 includes a housing 380, an activation member 382, as well as a biasing member 384. The housing 380 is sandwiched between the spud flange and the chuck. The housing has an overall cylindrical configuration with a pair of end walls 392, 394 as well as arcuate wall 396. The arcuate wall 396 includes an opening 398 which receives activation member 382. Also, on the interior surface of the arcuate wall, shoulders 400 are formed to cooperate with the activation member to maintain the activation member within the housing.

The activation member 382 includes an arcuate wall 404 which terminates with legs 406 and 408 at each end. The arcuate wall 404 is contoured to provide an aesthetic appearance of a continuous wall with the arcuate wall of the housing. The legs 406 and 408 have feet 410 and 412 which interact with the shoulders 400 to retain the activation member within the housing. Also, the interior surface of the arcuate wall 404 includes a biasing retaining member 416 as illustrated in FIGS. 22 and 23. The biasing retaining member couples the biasing member with the activation member so that as the activation member is moved, the biasing member 384 remains coupled with the activation member 382.

The biasing member 384 has an overall inverted U-shape with a web 420 and legs 422 and 424. The biasing member 384 is made from a spring wire material. The web 420 includes a projection 426 which is retained in the activation retention member 418. The web may have a serpentine configuration as shown in FIG. 22. The legs 422 and 424 are mirror images of one another. The legs 422 and 424 include a first portion 430, a second angled portion 432 and a curved foot portion 434. The foot portion 434 fits into the recesses in the spud and spindle as illustrated in FIG. 23.

In use, the feet 434 rest in the spud 379 and spindle recesses 326 to couple the chuck 320 with the spindle 324. Thus, the chuck 320 is locked onto the spindle. As the activation member 382 is pressed inward, the biasing member feet 434 ride along the arcuate surface 381 of the spud recess 379 until the feet 434 pass outside of the spindle recess as illustrated in phantom in FIG. 22. As this occurs, the chuck may be removed from the spindle. After the force has been removed from the activating member 382, the biasing member 384 returns the activation member 382 to its original position and the feet 434 return into the spud recess 379. To recouple the chuck with the spindle, the spud 362 is slid onto the spindle 324 wherein the chamfered surface 325 of the spindle contacts the biasing member feet 434 spreading the feet 434 apart from one another and enabling them to ride along the spindle 324. As force is continued axially on the chuck 320, the feet 434 contact the spindle recess 326 recoupling the biasing member 384 which, in turn, couples the chuck 320 with the spindle 324.

While the above detailed description describes the preferred embodiment of the present invention, the invention is susceptible to modification, variation, and alteration without deviating from the scope and fair meaning of the subjoined claims.

We claim:

1. A removable chuck comprising:
   a sleeve for connecting with a rotating spindle;
   a chuck coupled with said sleeve;
   a locking mechanism for retaining said sleeve on the rotating spindle, said locking mechanism comprising a locking member for seating in a recess in the spindle, said locking member movable from a first position, coupling the sleeve with the spindle recess, to a second position, where said locking member is out of the spindle recess; and
   said locking member biasing between said first position, where said sleeve is locked with said spindle, to said second position, enabling said sleeve to be removed from the spindle.

2. The removable chuck according to claim 1, wherein said locking member including an overall U-shaped spring for locking said sleeve with said spindle.

3. The removable chuck according to claim 1, wherein said locking member including a housing, an activation member, and a biasing member, said activation member moving said biasing member between said first and second positions for locking and enabling removal of said sleeve from the spindle.

4. The removable chuck according to claim 3, wherein said activation member moves transverse to an axis of said spindle.

5. The removable chuck according to claim 4, wherein said biasing member is an overall U-shaped spring.

6. A hand tool comprising:
   a hand tool having a rotatable spindle, said spindle including a recess; and
   a removable chuck, said removable chuck comprising:
      a sleeve for connecting with the rotating spindle;
      a chuck coupled with said sleeve;
      a locking mechanism for retaining said sleeve on the rotating spindle, said locking mechanism comprising a locking member for seating in a recess in the spindle, said locking member movable from a first position, coupling the sleeve with the spindle recess, to a second position, where said locking member is out of the spindle recess; and
      said locking member biasing between said first position, where said sleeve is locked with said spindle, to said second position, enabling said sleeve to be removed from the spindle.

7. The removable chuck according to claim 6, wherein said locking member including an overall U-shaped spring for locking said sleeve with said spindle.

8. The removable chuck according to claim 6, wherein said locking member including a housing, an activation member, and a biasing member, said activation member moving said biasing member between said first and second positions for locking and enabling removal of said sleeve and spindle.

9. The removable chuck according to claim 8, wherein said activation member moves transverse to an axis of said spindle.

10. The removable chuck according to claim 9, wherein said biasing member is an overall U-shaped spring.

* * * * *